United States Patent
Hayashi

(10) Patent No.: US 9,158,188 B2
(45) Date of Patent: Oct. 13, 2015

(54) LIGHT SOURCE DEVICE, PROJECTOR, AND LIGHT SOURCE DEVICE FABRICATION METHOD

(75) Inventor: Momoko Hayashi, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 386 days.

(21) Appl. No.: 13/599,328

(22) Filed: Aug. 30, 2012

(65) Prior Publication Data

US 2013/0050663 A1    Feb. 28, 2013

(30) Foreign Application Priority Data

Aug. 31, 2011  (JP) ................. 2011-188450

(51) Int. Cl.
G03B 21/14    (2006.01)
G03B 21/20    (2006.01)

(52) U.S. Cl.
CPC ........ *G03B 21/2033* (2013.01); *G03B 21/2093* (2013.01); *Y10T 29/49117* (2015.01); *Y10T 29/49826* (2015.01)

(58) Field of Classification Search
CPC ... F21Y 2103/003; F21V 5/007; H01S 3/025; H01S 5/022
USPC ........................................................ 353/100
See application file for complete search history.

(56) References Cited

U.S. PATENT DOCUMENTS

| 5,191,481 | A * | 3/1993 | Takizawa et al. ............. 359/811 |
| 5,905,751 | A | 5/1999 | Huang et al. |
| 7,680,161 | B2 | 3/2010 | Takahashi |
| 8,353,608 | B2 | 1/2013 | Someno et al. |
| 2003/0039036 | A1* | 2/2003 | Kruschwitz et al. .......... 359/707 |
| 2007/0071044 | A1* | 3/2007 | Takahashi ........................ 372/34 |
| 2012/0069567 | A1* | 3/2012 | Wu ................................ 362/235 |

FOREIGN PATENT DOCUMENTS

| CN | 101334582 A | 12/2008 |
| JP | 06-036324 A | 2/1994 |

(Continued)

OTHER PUBLICATIONS

Taiwanese Office Action dated Feb. 12, 2014 (and English translation thereof) in counterpart Taiwanese Application No. 101131454.

(Continued)

*Primary Examiner* — Sultan Chowdhury
*Assistant Examiner* — Danell L Owens
(74) *Attorney, Agent, or Firm* — Holtz, Holtz, Goodman & Chick PC

(57) ABSTRACT

There are provided a light source device where optical axes of a light source element and a lens are parallel and the element and the lens are disposed at a predetermined distance, a projector and a light source device fabrication method. A light source device includes a light source element having a flange portion and a cylindrical portion smaller in diameter than the flange portion, a light source element holder disposed abutting a rear of the flange portion, a collimator lens disposed at the front of the element, an annular member disposed between the element and the lens and of which a rear end face abuts a front surface of the flange portion and of which a front end face abuts a rear surface of the lens and a collimator lens holder which accommodates the lens in a hole portion.

15 Claims, 11 Drawing Sheets

(56) References Cited

FOREIGN PATENT DOCUMENTS

| | | |
|---|---|---|
| JP | 07022654 A | 1/1995 |
| JP | 2003281924 A | 10/2003 |
| JP | 2011134668 A | 7/2011 |
| JP | 2011134669 A | 7/2011 |
| TW | 200627671 A | 8/2006 |
| TW | 201128119 A | 8/2011 |
| WO | 2007032957 A2 | 3/2007 |

OTHER PUBLICATIONS

Chinese Office Action dated Aug. 1, 2014, issued in counterpart Chinese Application No. 201210315437.5.

Japanese Office Action dated Mar. 19, 2015, issued in counterpart Japanese Application No. 2011-188450.

* cited by examiner

# LIGHT SOURCE DEVICE, PROJECTOR, AND LIGHT SOURCE DEVICE FABRICATION METHOD

CROSS-REFERENCE TO RELATED APPLICATIONS

This application is based upon and claims the benefit of priority under 35 USC 119 of Japanese Patent Application No. 2011-188450 filed on Aug. 31, 2011, the entire contents of which, including the description, claims, drawings and abstract, are incorporated herein by reference.

BACKGROUND OF THE INVENTION

1. Field of the Invention

The present invention relates to a light source device, a projector and a light source device fabrication method.

2. Description of the Related Art

In these days, data projectors are used on many occasions as image projection units which project images including images of a screen of a personal computer and video images, as well as images based on image data which are stored in a memory card on to a screen. In these projectors, light emitted from a light source is collected on to a micromirror display element called a digital micromirror device (DMD) or a liquid crystal panel for projection of color images on to a screen.

Additionally, in association with propagation of personal computers and video equipment such as DVD players, such projectors have been finding a variety of applications from commercial presentations to domestic use.

Conventionally, the mainstream of these projectors has been those which utilize a high-intensity discharge lamp as a light source. In recent years, however, there have been made many developments and proposals on light source devices which use a plurality of semiconductor light emitting elements such as laser diodes together with associated optical components such as pluralities of lenses and mirrors.

Then, Japanese Unexamined Patent Application No. 6-36324 (JP-A-6-36324) proposes a light source unit using laser diodes as light source elements that facilitates the assemblage of optical components and which enables a highly accurate adjustment thereof while reducing the time required for bonding, thereby realizing the miniaturization of the light source device and the reduction in production costs thereof.

However, in the light source device proposed by JP-A-6-36342, although the positional adjustment of the light source elements is facilitated, the optical positional adjustment between the light source elements and associated lenses is not facilitated.

BRIEF SUMMARY OF THE INVENTION

The invention has been made in view of the aforesaid problem which is inherent in the related art, and an object of the invention is to provide a light source device in which an optical axis of a light source element and an optical axis of an associated lens are made to coincide with each other or parallel to each other and the light source element and the lens are easily disposed with a predetermined distance defined therebetween, a projector which includes this light source device, and a fabrication method of the light source device.

With a view to attaining the object, according to a first aspect of the invention, there is provided a light source device comprising: a light source element having a flange portion and a cylindrical portion having a cylindrical shape which is smaller in diameter than the flange portion; a light source element holder which is disposed with a rear of the flange portion of the light source element brought into abutment therewith; a collimator lens which transforms light emitted from the light source element into parallel light; a hollow cylindrical annular member that is disposed between the light source element and the collimator lens, and of which a rear end face is brought into abutment with a front surface of the flange portion of the light source element and a front end face is brought into abutment with a rear surface of the collimator lens; and a collimator lens holder which accommodates the collimator lens in a hole portion formed therein.

According to a second aspect of the invention, there is provided a projector comprising: a light source device; a display element; a light source side optical system which guides light from the light source device to the display element; a projection side optical system which projects an image emitted from the display element on to a screen; and a projector control unit which controls the light source device and the display element, wherein the light source device is the light source of the invention described above.

According to a third aspect of the invention, there is provided a light source device fabrication method for mounting: a light source element having a flange portion and a cylindrical portion having a cylindrical shape which is smaller in diameter than the flange portion; a light source element holder which is disposed with a rear of the flange portion of the light source element brought into abutment therewith; a collimator lens which transforms light emitted from the light source element into parallel light; a hollow cylindrical annular member that is disposed between the light source element and the collimator lens, and of which a rear end face is brought into abutment with a front surface of the flange portion of the light source element and a front end face is brought into abutment with a rear surface of the collimator lens; and a collimator lens holder which is disposed in abutment with the light source element holder, comprising; a first disposing step of disposing the light source element in the light source element holder; a second disposing step of disposing the collimator lens holder on the light source element holder by matching the light source element with a hole portion in the collimator lens holder so that an outer circumference of the flange portion of the light source element is brought into contact with the hole portion; a third disposing step of disposing the annular member in the hole portion of the collimator lens holder so that a front surface of the flange portion of the light source element is brought into abutment with the rear end face; and a fourth disposing step of disposing the collimator lens in the hole portion of the collimator lens holder so as to be brought into abutment with the front end face.

DETAILED DESCRIPTION OF THE PREFERRED EMBODIMENT

Hereinafter, am embodiment of the invention will be described by reference to the drawings.

Figure 1:
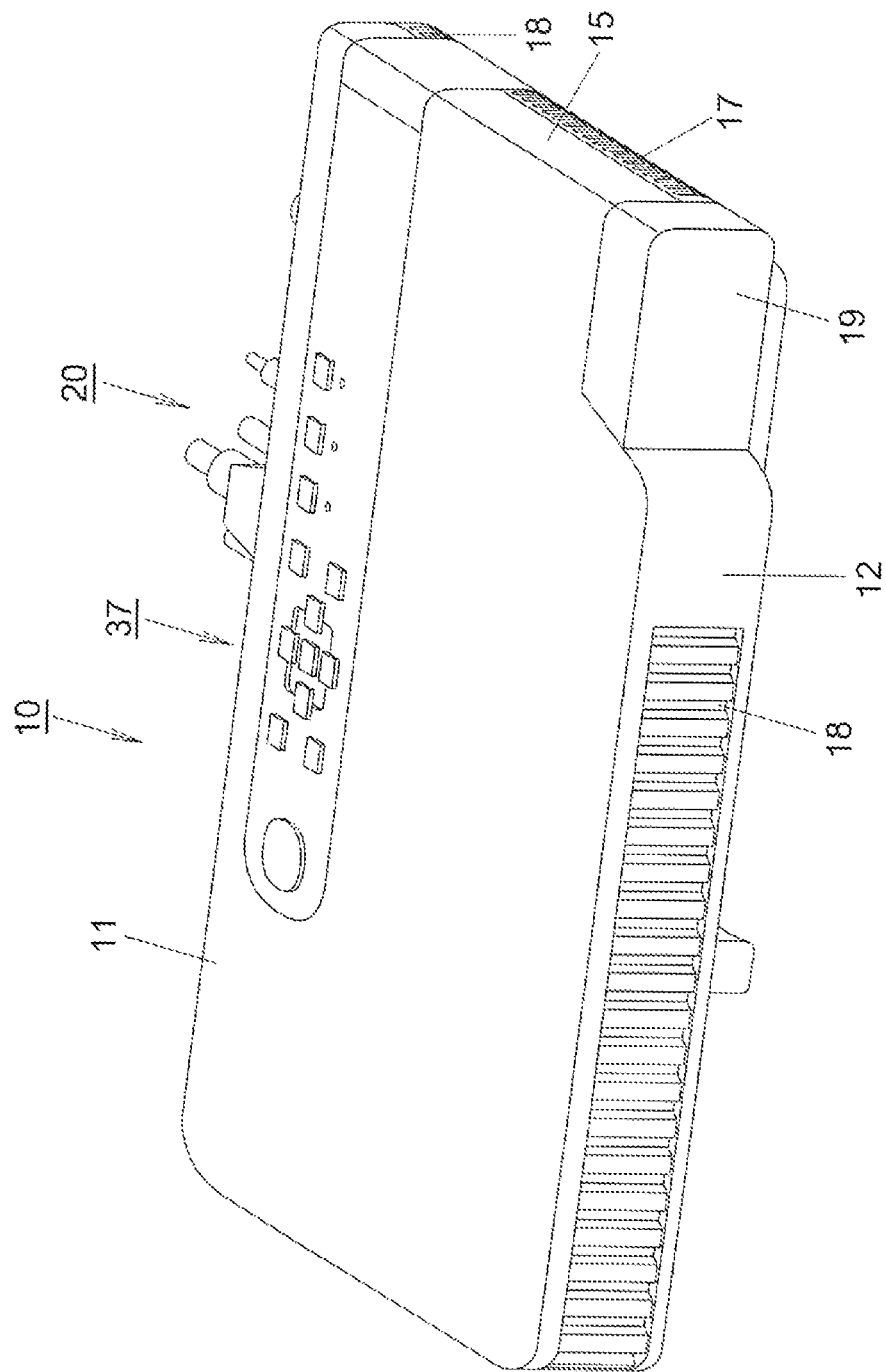
FIG. 1 is a perspective view showing an external appearance of a projector according to an embodiment of the invention.

FIG. 1 is a perspective view showing an external appearance of a projector 10.

It should be noted that in this embodiment, left and right with respect to the projector 10 denote, respectively, left and right directions with respect to a projecting direction, and front and rear with respect to the projector 10 denote, respectively, front and rear directions with respect to a direction towards a screen and a traveling direction of a pencil of light.

Additionally, as is shown in FIG. 1, the projector 10 has a substantially rectangular parallelepiped shape and has a lens cover 19 which covers a projection opening which is laid to a side of a front side panel 12 which is referred to as a front side panel of a projector casing. Additionally, a plurality of outside air inlet ports 18 are formed in the front side panel 12.

Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, a video signal input D-SUB terminal into which an analog RGB video signal is inputted, an S terminal, an RCA terminal, an audio output terminal and the like are provided and various types of terminals 20 including a power supply adaptor plug.

Additionally, a plurality of outside air inlet ports are formed in the back side panel. In addition, pluralities of inside air outlet ports 17 are formed in a right side panel which is a lateral side panel of the projector casing which is not shown and a left side panel 15 which is a lateral side panel shown in FIG. 1. Further, outside air inlet ports 18 are also formed in a position on the left side panel 15 which lies near a corner portion between the left side panel 15 and the back side panel.

Figure 2:
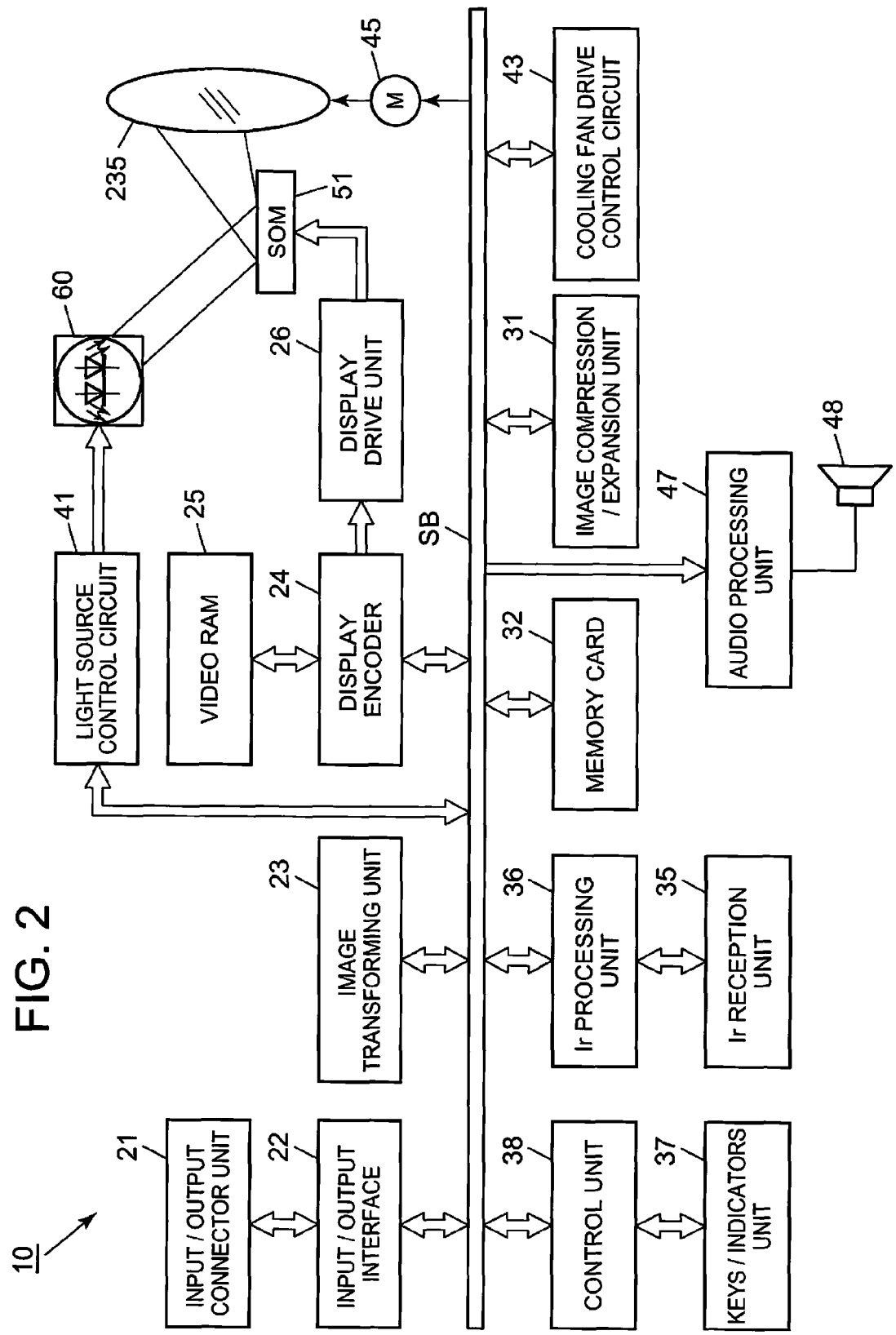
FIG. 2 is a functional block diagram of the projector according to the embodiment of the invention.

Next, a projector control unit of the projector 10 will be described by use of a functional block diagram shown in FIG. 2.

The projector control unit includes a control unit 38, an input/output interface 22, an image transforming unit 23, a display encoder 24, a display drive unit 26 and the like.

The control unit 38 governs the control of respective operations of circuitries within the projector 10 and includes a CPU, a ROM which stores in a fixed fashion operation programs of various types of settings and a RAM which is used as a working memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

In addition, the display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24.

Additionally, in this projector 10, a pencil of light which is emitted from a light source unit 60 is shone onto the display element 51 via a light source side optical system, which will be described later, to thereby form an optical image based on reflected light reflected by the display element 51. The image so formed is then projected on to a screen, not shown, for display thereon via a projection side optical system. In addition, a movable lens group 235 of this projection side optical system is driven by a lens motor 45 for zooming or focusing.

Additionally, an image compression/expansion unit 31 executes a recording process in which a luminance signal and a color difference signal of an image signal are data compressed through processes such as ADCT and Huffman coding, and the compressed data is sequentially written onto a memory card 32 which is configured as a detachable recording medium.

Further, when in a reproducing mode, the image compression/expansion unit 31 reads out the image data which is recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the projector casing are sent out directly to the control unit 38. Key operation signals from the remote controller are received by the Ir reception unit 35, and a code signal which is demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a loudspeaker 48 to radiate loudly sound or voice based on the audio data.

In addition, the control unit 38 controls a light source control circuit 41 which is configured as a light source control unit. This light source control circuit 41 controls individually the emission of light of red wavelength band, light of green wavelength band and light of blue wavelength band from the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60 so as to control the rotating speeds of cooling fans based on the results of the temperature detection.

Additionally, the control unit 38 also causes the cooling fan drive control circuit 43 to make the cooling fans continue to rotate even after the power supply of a projector main body is switched off by use of a timer or the like. Alternatively, the control unit 38 causes the cooling fan drive control circuit 43 to make the power supply to the projector main body be cut off depending upon the results of the temperature detection by the temperature sensors.

Next, an internal construction of the projector 10 will be described.

Figure 3:
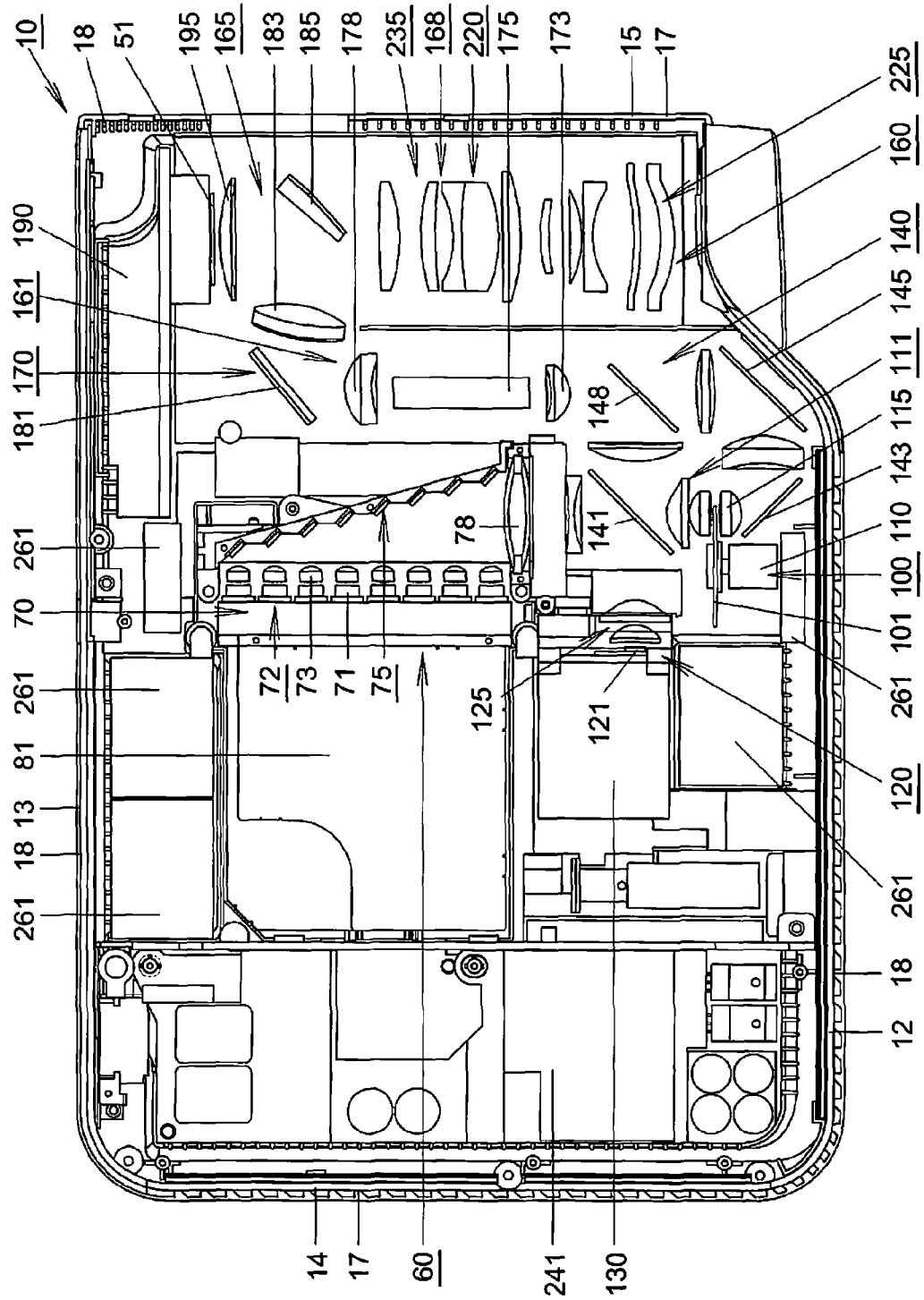
FIG. 3 is an exemplary plan view showing an internal construction of the projector according to the embodiment of the invention.

FIG. 3 is an exemplary plan view showing an internal construction of the projector 10.

As shown in FIG. 3, the projector 10 includes a control circuit board 241 in the vicinity of the right side panel 14. This control circuit board 241 includes a power supply circuit block and a light source control block. Additionally, the projector 10 includes the light source unit 60 which is provided to a side of the control circuit board 241, that is, at a substantially central portion of the projector casing. Further, the projector 10 includes an optical system unit 160 between the light source unit 60 and the left side panel 15.

The light source unit 60 includes an excitation light shining device 70, a luminescent light emitting device 100, a red light source device 120 and a light guiding optical system 140. The excitation light shining device 70 is disposed at a substantially transversely central portion of the projector casing and in the vicinity of the back side panel 13. The luminescent light emitting device 100 is disposed on an optical axis of a pencil of light which is emitted from the excitation light shining device 70 and in the vicinity of the front side panel 12. The red light source device 120 is disposed between the excitation light shining device 70 and the luminescent light emitting device 100. The light guiding optical system 140 turns the directions of optical axes of light which is emitted from the luminescent light emitting device 100 and light which is emitted from the red light source device 120 so that the optical axes of the light emitted from the luminescent light emitting device 100 and the light emitted from the red light source device 120 are collected to the same optical axis so as to be guided to an entrance port of a light tunnel 175 which constitutes a predetermined plane.

The excitation light shining device 70 includes a light source group 72 which includes a plurality of excitation light sources 71 which are disposed so that optical axes thereof are parallel to the back side panel 13, a plurality of reflection mirrors 75 which each turn an optical axis of light emitted from each of the excitation light sources 71 of the light source group 72 by 90 degrees in the direction of the front side panel 12, a collective lens 78 which collects light emitted from the excitation light sources 71 and reflected by the plurality of reflection mirrors 75, and a heat sink 81 functioning as a cooling device which is disposed between the excitation light sources 71 and the right side panel 14.

In the light source group 72, the excitation light sources 71 which are a plurality of blue laser light emitting diodes are arranged into a matrix.

Collimator lenses 73 are disposed individually on optical axes of the excitation light sources 71. The collimator lenses 73 are each a lens which transforms light emitted from each of the excitation light sources 71 into parallel light so as to enhance the directivity thereof.

In addition, the plurality of reflection mirrors 75 are arranged so as to form in the shape like steps of a staircase. The reflection mirrors 75 reflect pencils of light which are emitted from the light source group 72 towards the collective lens 78 while reducing sectional areas of the pencils of light, which are emitted from the excitation light sources 71, in a horizontal direction by narrowing spaces therebetween.

A plurality of cooling fans 261 are disposed between the heat sinks 81 and the back side panel 13, and the excitation light sources 71 are cooled by the cooling fans 261 and the heat sink 81.

Further, a cooling fan 261 is also disposed between the reflecting mirrors 75 and the back side panel 13, whereby the reflecting mirrors 75 and the collective lens 78 are cooled.

The luminescent light emitting device 100 includes a luminescent wheel 101 which is disposed so as to be parallel to the front side panel 12, that is, so as to be at right angle to an optical axis of light emitted from the excitation light shining device 70, a wheel motor 110 which rotationally drives the luminescent wheel 101, a collective lens group 111 which collects a pencil of light which is emitted from the excitation light shining device 70 to the luminescent wheel 101 and a pencil of light which is emitted from the luminescent wheel 101 in the direction of the back side panel 13, and a collective lens 115 which collects a pencil of light which is emitted from the luminescent wheel 101 in the direction of the front side panel 12.

A green luminescent light emitting area which receives light emitted from the excitation light shining device 70 as excitation light to emit luminescent light of green wavelength band and a diffuse light transmission area which transmits light emitted from the excitation light shining device 70 in a diffusing fashion are provided end to end in a circumferential direction on the luminescent wheel 101.

In addition, a base of the green luminescent light emitting area is a metallic base formed of copper, aluminum or the like, and a surface of a side of the base which faces the backside panel 13 is mirror finished through silver deposition or the like, and a layer of a green luminescent material is laid on this mirror-finished surface.

Further, a base of the diffuse light transmission area is a transparent base having light transmissivity, and minute irregularities are formed on a surface of the base through sandblasting.

Then, light that is emitted from the excitation light shining device 70 and which is shone on to the green luminescent material layer on the luminescent wheel 101 excites the green luminescent material on the green luminescent material layer. Pencils of luminescent light which are emitted in every direction from the green luminescent material so excited are then directed directly towards the back side panel 13 or are reflected on a surface of the luminescent wheel 101 so as to be eventually directed towards the back side panel 13 to thereby be incident on the collective lens group 111.

In addition, light that is emitted from the excitation light shining device 70 and which is shone onto the diffuse light transmission area of the luminescent wheel 101 enters the collective lens 115 as diffuse transmission light that is diffused by the minute irregularities.

Additionally, a cooling fan 261 is disposed between the wheel motor 110 and the front side panel 12, whereby the luminescent light emitting device 100 is cooled by this cooling fan 261.

The red light source device 120 is a single color light emitting device which includes a red light source 121 and a collective lens group 125 which collects light which is emitted from the red light source 121. This red light source 121 is disposed so that an optical axis thereof is at right angle to the optical axes of the excitation light sources 71.

The red light source 121 is a red light emitting diode which emits light of red wavelength band. This red light source device 120 is disposed so that the optical axis thereof intersects the axis of light emitted from the excitation light shining device 70 and the axis of luminescent light of green wavelength band which is emitted from the luminescent wheel 101.

Further, the red light source device 120 includes a heat sink 130 as a cooling device which is disposed on a side of the red light source 121 which faces the right side panel 14. Additionally, a cooling fan 261 is disposed between the heat sink 130 and the front side panel 12, and the red light source 121 is cooled by this cooling fan 261.

The light guiding optical system 140 includes collective lenses which collect pencils of light of red, green and blue wavelength bands and reflecting mirrors, dichroic mirrors and the like which turn the directions of optical axes of the pencils of light of red, green and blue wavelength bands to direct them to the same optical axis.

Specifically speaking, in the light guiding optical system 140, a first dichroic mirror 141 is disposed in a position where the optical axes of light of blue wavelength band which is emitted from the excitation light shining device 70 and light of green wavelength band which is emitted from the luminescent wheel 101 intersect the optical axis of light of red wavelength band which is emitted from the red light source device 120. This first dichroic mirror 141 transmits light of blue wavelength band and light of red wavelength band and reflects light of green wavelength band to turn the direction of the optical axis of the green light by 90 degrees towards the left side panel 15.

In addition, a first reflection mirror 143 is disposed on the optical axis of light of blue wavelength band which has diffuse transmitted through the luminescent wheel 101, that is, between the collective lens 115 and the front side panel 12. This first reflection mirror 143 reflects light of blue wavelength band and turns an optical axis of the blue light by 90 degrees towards the direction of the left side panel 15.

Further, a second reflection mirror 145 is disposed on the optical axis of the light of blue wavelength band which is reflected on the first reflection mirror 143 and in the vicinity of the optical system unit 160, this second reflection mirror 145 turns the optical axis of the blue light by 90 degrees in the direction of the back side panel 13.

In addition, in the light guiding optical system 140, a second dichroic mirror 148 is disposed in a position where the optical axis of light of red wavelength band which has passed through the first dichroic mirror 141 and the optical axis of light of green wavelength band which is reflected by the first dichroic mirror 141 so as to coincide with the optical axis of this red light intersect the optical axis of light of blue wavelength band which is reflected by the second reflection mirror 145, and this second dichroic mirror 148 transmits light of blue wavelength band and reflects light of green and red wavelength bands by 90 degrees in the direction of the back side panel 13.

Additionally, collective lenses are disposed between the dichroic mirrors and the reflection mirrors, respectively. Further, a collective lens 173 is disposed in the vicinity of the light tunnel 175. This collective lens 173 collects light source light to the entrance port of the light tunnel 175.

The optical system unit 160 is configured into a substantially U-shape by three blocks such as an illumination side block 161 which is positioned to a left-hand side of the excitation light shining device 70, an image generating block 165 which is positioned in the vicinity of a position where the back side panel 13 intersects the left side panel 15, and a projection side block 168 which is positioned between the light guiding optical system 140 and the left side panel 15.

The illumination side block 161 includes part of a light source side optical system 170 which guides light source light which is emitted from the light source unit 60 to the display element 51 that is possessed by the image generating block 165.

The light source side optical system 170 that the illumination side block 161 possesses includes the light tunnel 175 which transforms a pencil of light which is emitted from the light source unit 60 into a pencil of light in which the intensity thereof is uniformly distributed, a collective lens 178 which collects light which is emitted from the light tunnel 175, and an optical axis turning mirror 181 which turns the direction of the optical axis of a pencil of light which is emitted from the light tunnel 175 in the direction of the image generating block 165.

The image generating block 165 has, as the light source side optical system 170, a collective lens 183 which collects the light source light which is reflected by the optical axis turning mirror 181 to the display element 51 and a shining mirror 185 which shines the pencil of light which has passed through the collective lens 183 to the display element 51 at a predetermined angle. Further, the image generating block 165 includes a DMD which is the display element 51.

A heat sink 190 is disposed between the display element 51 and the back side panel 13 for cooling the display element 51. Thus, the display element 51 is cooled by this heat sink 190. Additionally, a condenser lens 195, which is part of a projection side optical system 220, is disposed in the vicinity of the front of the display element 51.

The projection side block 168 has a group of lenses of the projection side optical system 220 which projects the "on" light which is reflected on the display element 51 on to the screen. This projection side optical system 220 includes a fixed lens group 225 which is incorporated in a fixed lens barrel and a movable lens group 235 which is incorporated in a movable lens barrel. These groups of lenses are configured into a variable focus lens having a zooming function, and the movable lens group 235 is moved by a lens motor for zooming and focusing.

Next, the configuration of the light source device of the invention will be described in detail by use of the drawings which has the excitation light sources 71 which are made up of the collimator lenses 73 and the blue laser diodes.

Figure 4:
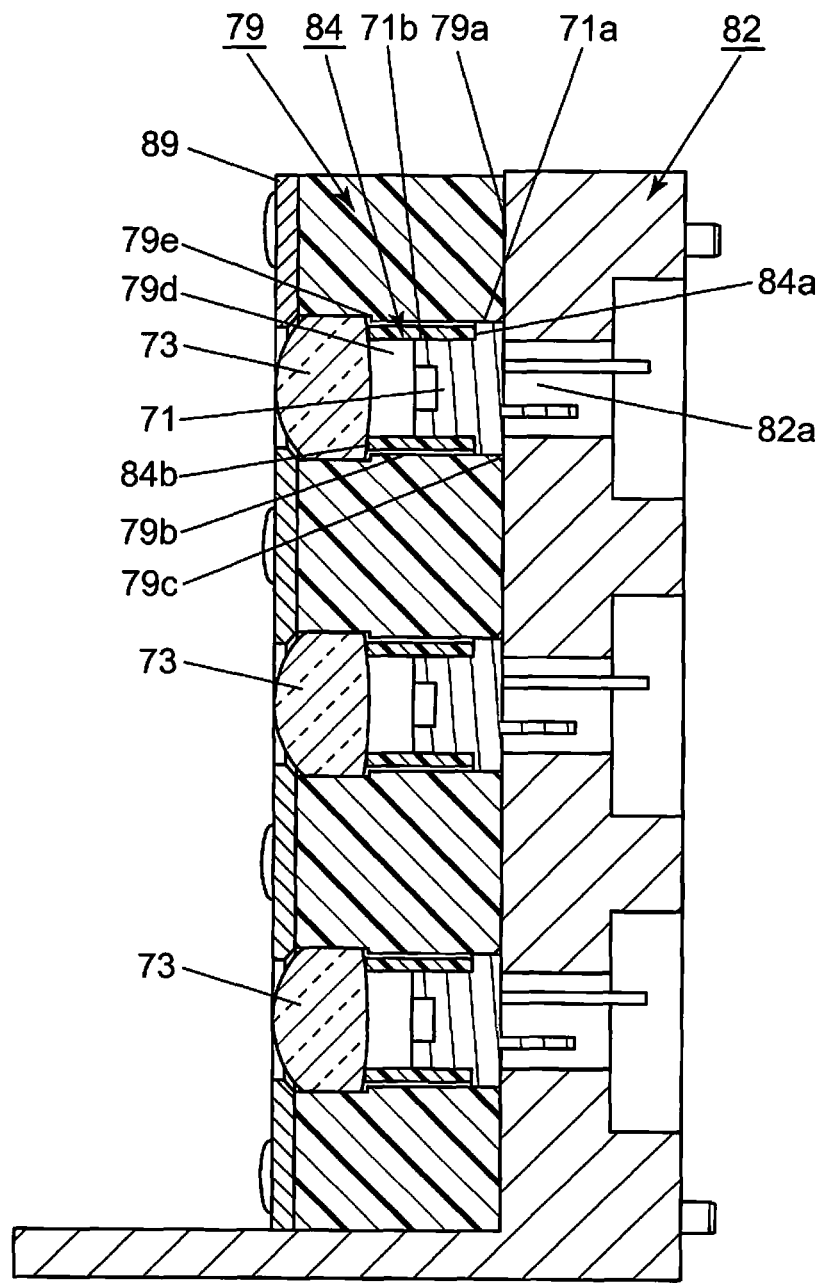
FIG. 4 is a diagram showing an example of a layout of a light source device according to the embodiment of the invention.

FIG. 4 is a diagram showing an example of a layout of the light source device. In this embodiment, left and right with respect to the light source device of the invention denote left and right directions with respect to the projecting direction of the excitation light sources 71 shown in FIG. 4, respectively, and as to front and rear with respect to the light source device, the projecting direction of the excitation light source devices denotes a front direction.

As shown in FIG. 4, the light source device includes the excitation light sources 71 which are the blue laser diodes which are the light source elements, a light source element holder 82 in which the excitation light sources 71 are disposed, the collimator lenses 73 each of which is formed in cylindrical shape so as to transform light emitted from the excitation light source 71 into a parallel light and of which a light entrance side and a light exist side are formed into predetermined curved surfaces, spacers 84 which are annular members which are interposed between the excitation light sources 71 and the collimator lenses 73 and a collimator lens holder 79 which has hole portions 79d which hold the corresponding collimator lenses 73.

Each of the excitation light sources 71 has a cylindrical metallic flange portion 71a which can dissipate heat and a cylindrical portion 71b having a cylindrical shape which is smaller in diameter than the flange portion 71a.

The light source element holder 82 is a flat plate-shaped heat dissipating member made of aluminum or the like and has hole portions 82a through which lead terminals of the excitation light sources 71 are inserted in a rear surface thereof.

The lead terminals of the excitation light sources 71 which are inserted through the hole portions 82a of the light source element holder 82 are connected with the control circuit board 241 on which the light source control circuit 41 is mounted by lead wires, not shown, a flexible circuit board or the like at the rear side of the light source element holder 82.

The spacer 84 is a hollow cylindrical annular member made of a metal or a heat resisting hard resin, and a rear surface of the spacer 84 is made into a rear end face 84a which is a first annular surface and a front surface of the spacer 84 is made into a front end face 84b which is a second annular surface.

Then, the spacer 84 is brought into abutment with a front surface of the flange portion 71a of the excitation light source 71 at the rear end face 84a thereof, whereas the spacer 84 is brought into abutment with a rear surface of the collimator lens 73 at the front end face 84b thereof.

Additionally, the spacer 84 is formed through machining or injection molding so that the front end face 84b and the rear end face 84a are parallel to each other while being made to be at right angle to an axis of the cylindrical shape of the spacer 84.

By adopting this configuration, the rear end face 84a and the front end face 84b of the small cylindrical spacer 84 can be formed easily into planes which are parallel to each other so as to be at right angle to the optical axes of the excitation light source 71 and the collimator lens 73.

Consequently, by using this spacer 84 so as to be interposed between the excitation light source 71 and the collimator lens 73, the optical axis of the excitation light source 71 and the collimator lens 73 can be made parallel to or coincide with each other and the excitation light source 71 and the collimator lens 73 can be disposed at a predetermined distance.

The collimator lens holder 79 is a flat plate-shaped member made of a metal or a heat resisting hard resin, and as shown in FIG. 4, a rear surface of the flat plate shape is brought into abutment with an abutment surface 79a which is a front surface of the light source element holder 82.

Additionally, the collimator lens holder 79 has hole portions 79d having a cylindrical portion 79b in the flat plate, and the constituent members such as the excitation light source 71, the spacer 84 and the collimator lens 73 are disposed so as to be inserted and accommodated in an interior of the hole portion 79d.

Here, a diameter of a rear side of the hole portion 79d of the collimator lens holder 79 is made into a diameter which accommodates therein an outside diameter of the spacer 84, and a diameter of a front side of the hole portion 79d in the collimator lens holder 79 is made into a diameter which accommodates therein the collimator lens 73 which has an outside diameter larger than the outside diameter of the spacer 84.

Additionally, in this configuration, in order that the front end face 84b of the spacer 84 is brought into abutment with a rear surface of the collimator lens 73, the length (the height) of the spacer 84 needs to be a length which enables the spacer 84 to project further forwards than a boundary portion (a step portion) 79e between a rear side portion and a front side portion of the hole portion 79d.

In addition, a tapered portion 79c is formed at a circumferential edge of a rear opening portion of the hole portion 79d of the collimator lens holder 79, facilitating the assemblage of the excitation light source 71 or the like into the hole portion 79d.

The light source device includes a metallic fastening plate 89 which is a thin plate-shaped lens fastening member for fastening the collimator lens 73, and this metallic fastening plate 89 has hole portions in portions where light emitted from the collimator lenses 73 passes.

The fastening plate 89 suppresses the movement in the direction of their optical axes of the collimator lenses 73 which are held while being positioned by the spacers 84 and the collimator lens holder 79, thereby making it possible to fix the collimator lenses 73 in an appropriate positions in an ensured fashion.

The configuration in which the excitation light sources and the collimator lenses 73 are positioned at the predetermined distance by use of the spacers 84 while the optical axes of the excitation light sources 71 and the optical axes of the collimator lenses 73 are made to coincide with or parallel to each other is not limited to the configuration described above.

Figure 5:
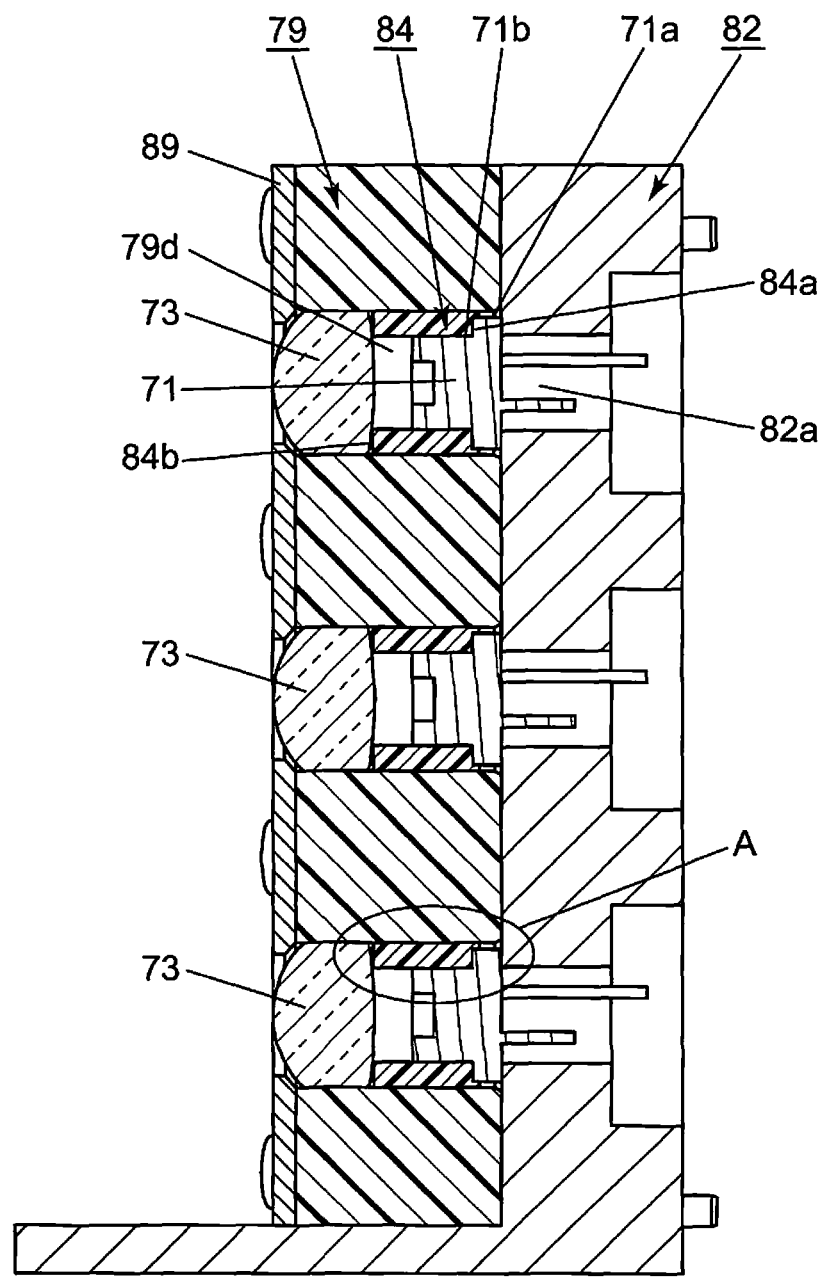
FIG. 5 is a diagram showing another example of a layout of the light source device according to the embodiment of the invention.
Figure 6:
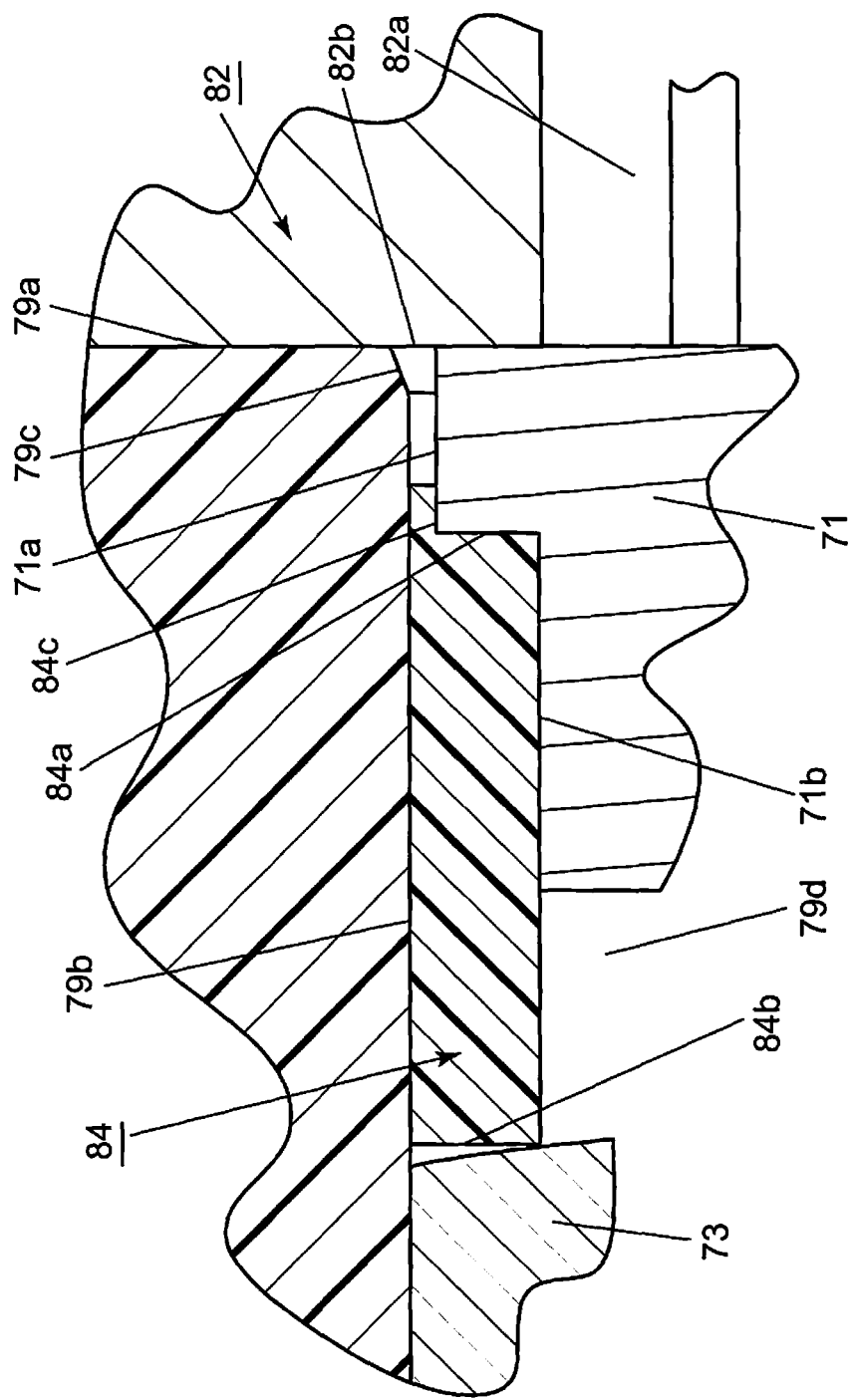
FIG. 6 is an enlarged view of a main part A of the layout of the light source device shown in FIG. 5.

For example, as shown in another example of a layout of the light source device shown in FIGS. 5 and 6 (FIG. 6 is an enlarged view of a main part A of the layout of the light source device shown in FIG. 5), the portion of the rear end face 84a at the rear of the spacer 84 which is the annular member may be made to be brought into engagement not only with a front surface of a flange portion 71a of an excitation light source 71 but also with a lateral surface of the flange portion 71a.

Additionally, as this occurs, being different form the example shown in FIG. 4, a hole portion 79d of a collimator lens holder 79 is formed so that a diameter of the hole portion 79d of the collimator lens holder 79 is uniform from a front end to a rear end thereof based on the understanding that an outside diameter of the spacer 84 and an outside diameter of the collimator lens 73 are substantially the same.

Specifically, as shown in FIG. 6, a first annular portion 84c is formed at a circumferential edge of an outer circumference of a rear end face 84a so as to project to the rear for engagement with part of a lateral surface of the flange portion 71a of the excitation light source 71. The spacer 84, which has the first annular portion 84c along the outer circumference of the rear end face 84a, is interposed so as to be erected between the excitation light source 71 and the collimator lens 73, whereby an optical axis of the excitation light source and an optical axis of the collimator lens 73 are made to coincide with each other in a parallel fashion and the excitation light source 71 and the collimator lens 73 are disposed at a predetermined distance. Thus, the disposing position of the excitation light source 71 is controlled, and the excitation light source 71 can be disposed in a predetermined position.

Figure 7:
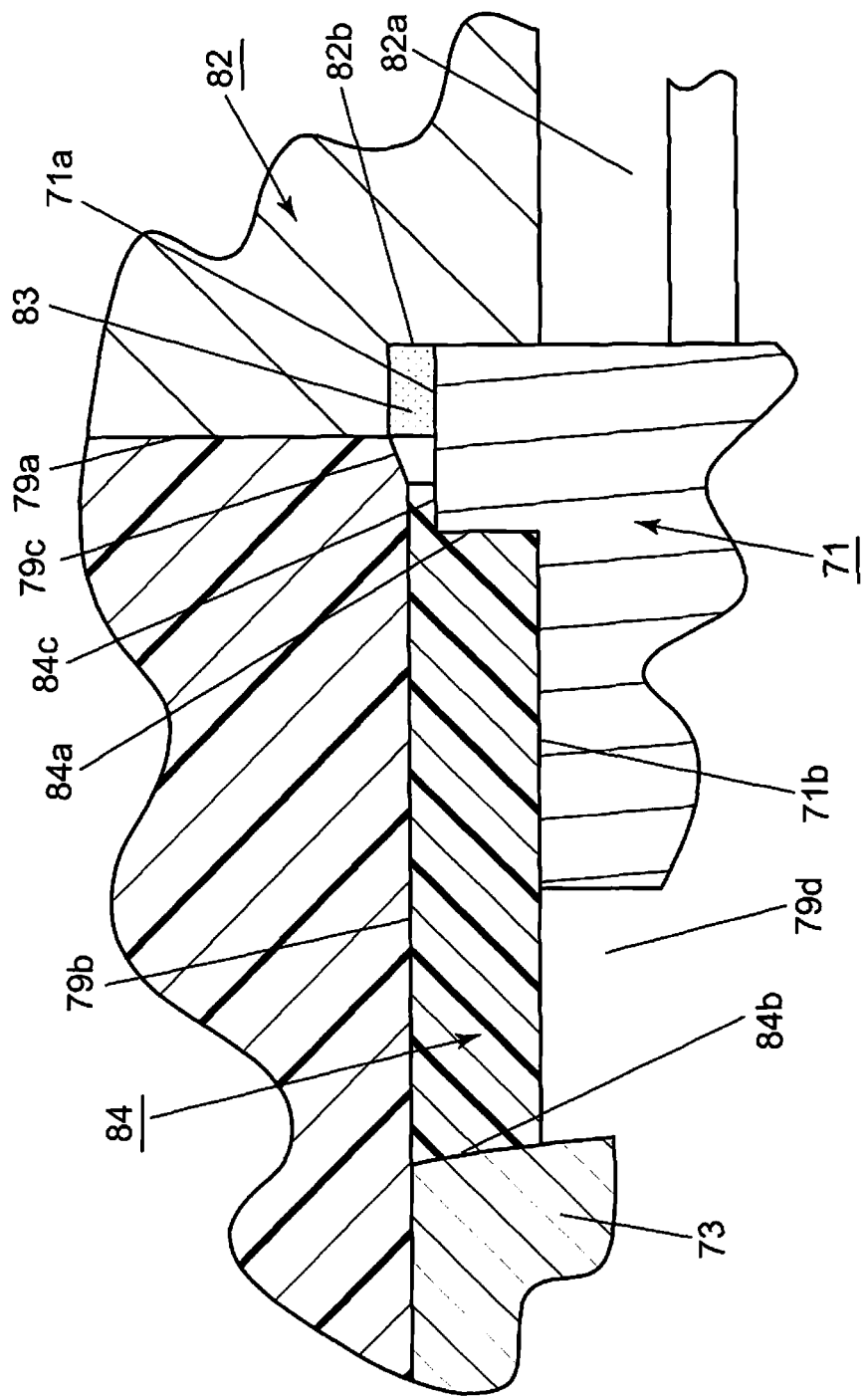
FIG. 7 is an enlarged diagram of a further example of a layout of the light source device according to the embodiment of the invention.

Additionally, as shown in a further example of a layout of the light source device shown in FIG. 7, a configuration may be adopted in which a depressed element bearing portion 82b is provided at a front surface of the light source element holder 82, whereby a rear surface of the flange portion 71a of the excitation light source 71 is borne by the element bearing portion 82b and a heat conductive filling material such as a heat conductive grease 83 or the like is filled in a gap defined in a lateral surface portion of the flange portion 71a.

It should be noted that even in the event that the spacer 84 is used in which the first annular portion 84c is not provided at the rear end face 84a thereof, the configuration may be adopted in which the depressed element bearing portion 82b is provided at the front surface of the light source element holder 82, whereby the rear surface of the flange portion 71a of the excitation light source 71 is borne by the element bearing portion 82b and the heat conductive filling material such as the heat conductive grease 83 is filled in the gap defined in the lateral surface portion of the flange portion 71a.

By adopting this configuration, not only heat that is dissipated from the rear surface of the flange portion 71a but also heat that is dissipated from the lateral surface of the flange portion 71a by way of the heat conductive filling material can be conducted to the light source element holder 82 by way of the depressed element bearing portion 82b, thereby making it possible to dissipate heat generated in the excitation light source 71 in an effective fashion.

In addition, in the configuration of the light source device that has the spacer 84 having the first annular portion 84c, as shown in FIG. 7, a configuration may be adopted in which the front end face 84b of the spacer 84 is formed into a similar curved surface to (a matching surface with) a rear curved surface of the collimator lens 73 so that the front end face 84b matches the rear curved surface of the collimator lens 73 so as to be brought into abutment therewith.

Additionally, in the spacer 84 in which the first annular portion 84c is not provided at the rear end face 84a of the spacer 84, as shown in FIG. 4, the configuration may be adopted in which the front end face 84b is formed into the similar curved surface to the rear curved surface of the collimator lens 73 so that the front end face 84b matches the rear curved surface of the collimator lens 73 so as to be brought into abutment therewith.

By adopting this configuration, the front end face 84b of the spacer 84 is made into the similar curved surface to the rear curved surface of the collimator lens 73, and by interposing this spacer 84 between the excitation light source 71 and the collimator lens 73, whereby the optical axis of the excitation light source 71 and the optical axis of the collimator lens 73 are made parallel, and the optical axis of the excitation light source 71 and the optical axis of the collimator lens 73 are made to coincide with each other in the parallel fashion. Thus, by disposing the excitation light source 71 and the collimator lens 73 at the predetermined distance, the disposing position of the excitation light source 71 can be controlled and the excitation light source 71 can be disposed in the predetermined position.

Figure 8:
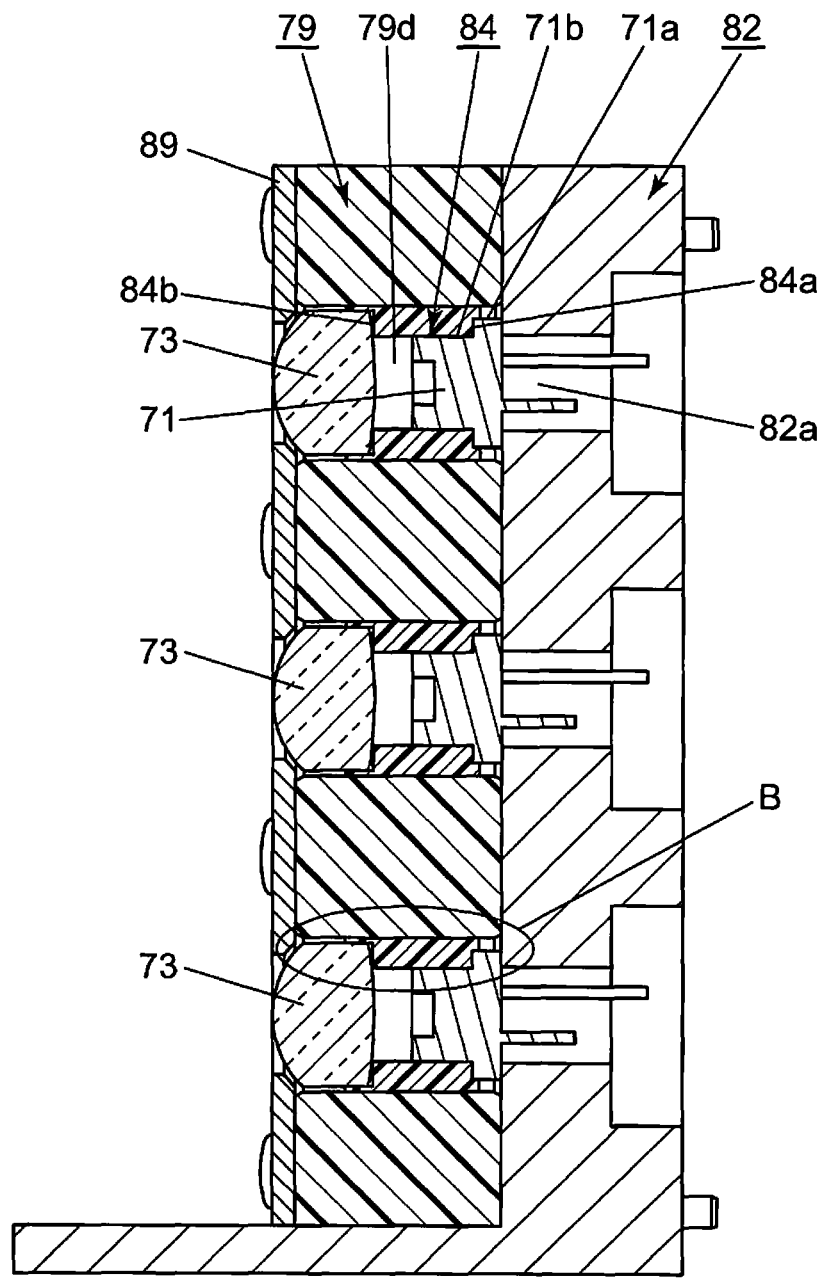
FIG. 8 is a diagram of an example of a layout of the light source device according to the invention.
Figure 9:
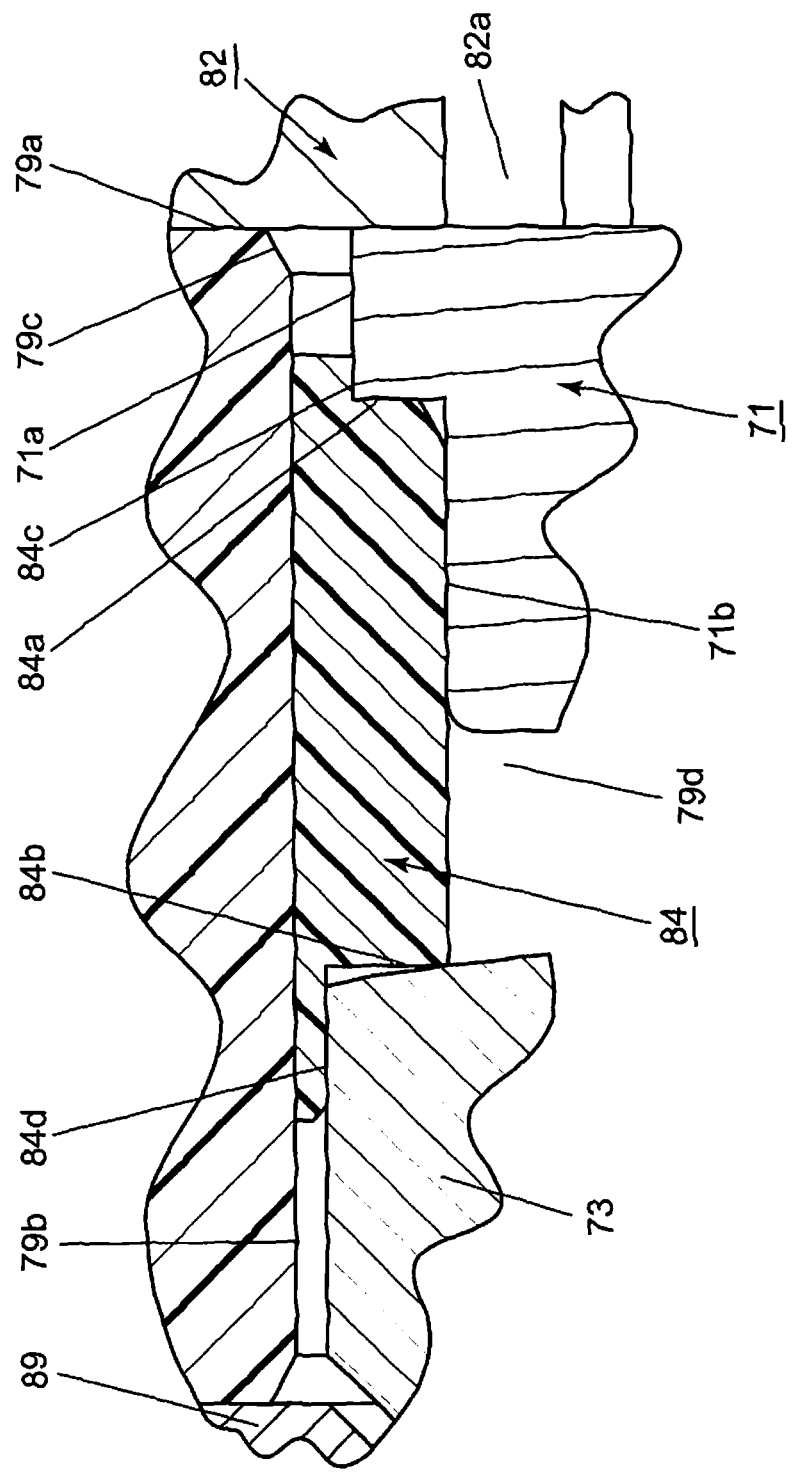
FIG. 9 is an enlarged view of a main part B of the layout of the light source device shown in FIG. 8.

Additionally, the light source device may adopt, for example, a configuration in which the first annular portion 84c is provided at the portion of the rear end surface 84a of the spacer 84 and as shown in FIGS. 8 and 9 (FIG. 9 is an enlarged view of a main part B of an example of a layout of the light source device shown in FIG. 8), the portion of the front end face 84b is brought into engagement not only with the rear surface of the collimator lens 73 but also with part of a rear lateral surface of the collimator lens 73 so as to control the disposing positions of the collimator lens 73 and the excitation light source 71.

Specifically, as shown in FIG. 9, the spacer 84 has a second annular portion 84d which is provided at a circumferential edge of an outer circumference of the front end face 84b so as to project to the front to thereby hold part of the rear lateral surface of the collimator lens 73.

By adopting this configuration, the spacer 84 having the first annular portion 84c and the second annular portion 84d is interposed between the excitation light source 71 and the collimator lens 73 so as to be erected therebetween, whereby the optical axis of the excitation light source 71 and the optical axis of the collimator lens 73 are made parallel to each other, or the optical axis of the excitation light source 71 and the optical axis of the collimator lens 73 are made to coincide with each other, and the excitation light source 71 and the collimator lens 73 are disposed at the predetermined distance. Thus, by disposing the excitation light source 71 and the collimator lens 73 in that way, the disposing position of the excitation light source 71 can be controlled and the excitation light source 71 can be disposed in the predetermined position.

In this way, in the various cases that have been described heretofore, the collimator lens 73 and the excitation light source 71 can be disposed by the spacer 84 so that the optical axis of the excitation light source 71 and the optical axis of the collimator lens 73 are made parallel to each other or made to coincide with each other and the excitation light source 71 and the collimator lens 73 can be disposed at the predetermined distance.

Additionally, it should be noted that the configuration in which the depressed element bearing portion 82b is provided at the front surface of the light source element holder 82 so that the rear surface of the flange portion 71a of the excitation light source 71 is borne at this element bearing portion 82b and the heat conductive filling material such as the heat conductive grease 83 is filled in the gap defined at the lateral surface portion of the flange portion 71a may also be adopted for the light source device which employs the spacer 84 which has the first annular portion 84c which is provided at the circumferential edge of the outer circumference of the rear end face 84a and the second annular portion 84d which is provided at the circumferential edge of the outer circumference of the front end face 84b.

By adopting this configuration, in the light source element holder 82, not only heat that is dissipated from the rear surface of the flange portion 71a but also heat that is dissipated from the lateral surface of the flange portion 71 byway of the heat conductive filling material can be conducted to the light source element holder 82 by way of the depressed element bearing portion 82b, thereby making it possible to dissipate heat generated in the excitation light source 71 in an effective fashion.

In addition, the configuration in which the front end face 84b is formed into the similar curved surface to the rear curved surface of the collimator lens 73 so that the front end face 84b matches the rear curved surface of the collimator lens 73 so as to be brought into abutment therewith may also be adopted for the light source device employing the spacer 84 which has the first annular portion 84c and the second annular portion 84d.

By adopting this configuration, the front end face 84b of the space 84 is formed into the similar curved surface to the rear curved surface of the collimator lens 73, and by interposing the spacer 84 between the excitation light source 71 and the collimator lens 73, the optical axis of the excitation light source 71 and the optical axis of the collimator lens 73 are made parallel to each other, or the optical axis of the excitation light source 71 and the optical axis of the collimator lens 73 are made to coincide with each other, and the excitation light source 71 and the collimator lens 73 are disposed at the predetermined distance. Thus, the disposing position of the excitation light source 71 can be controlled, and the excitation light source 71 can be disposed in the predetermined position.

Next, the flow of a fabrication method of the light source device according to the invention will be described by use of the drawings.

Figure 10:
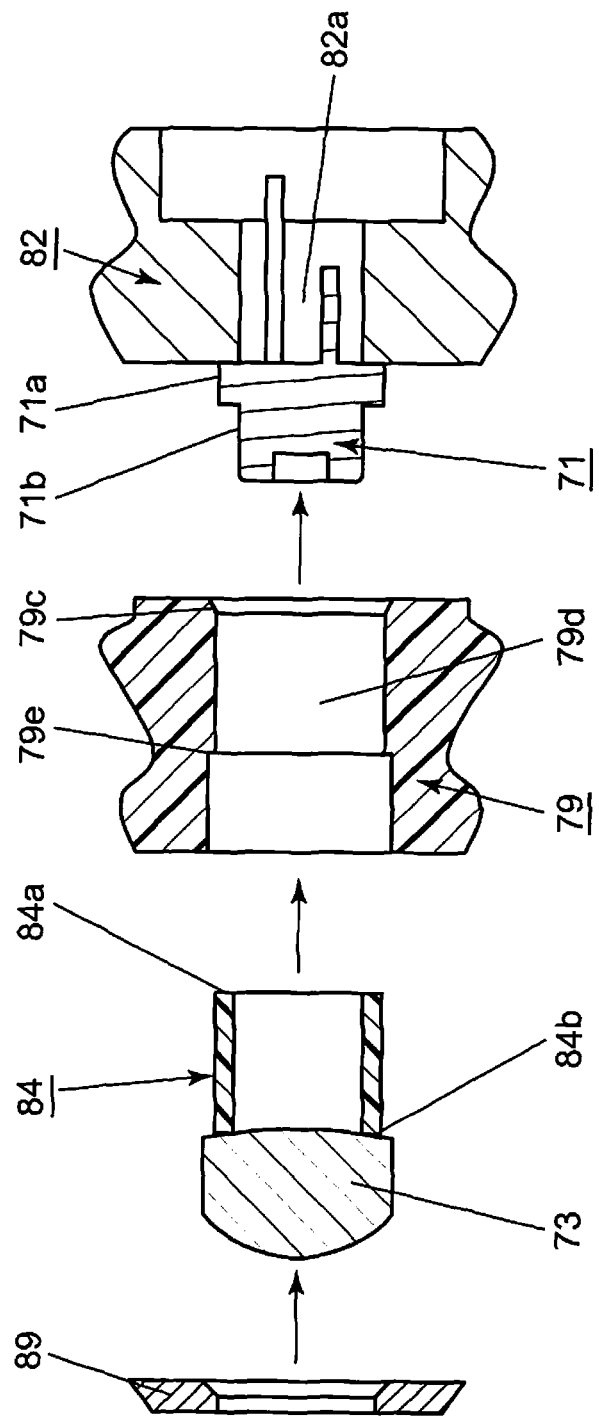
FIG. 10 is an explanatory diagram showing a flow of an assembling process for the layout of the light source device shown in FIG. 4.
Figure 11:
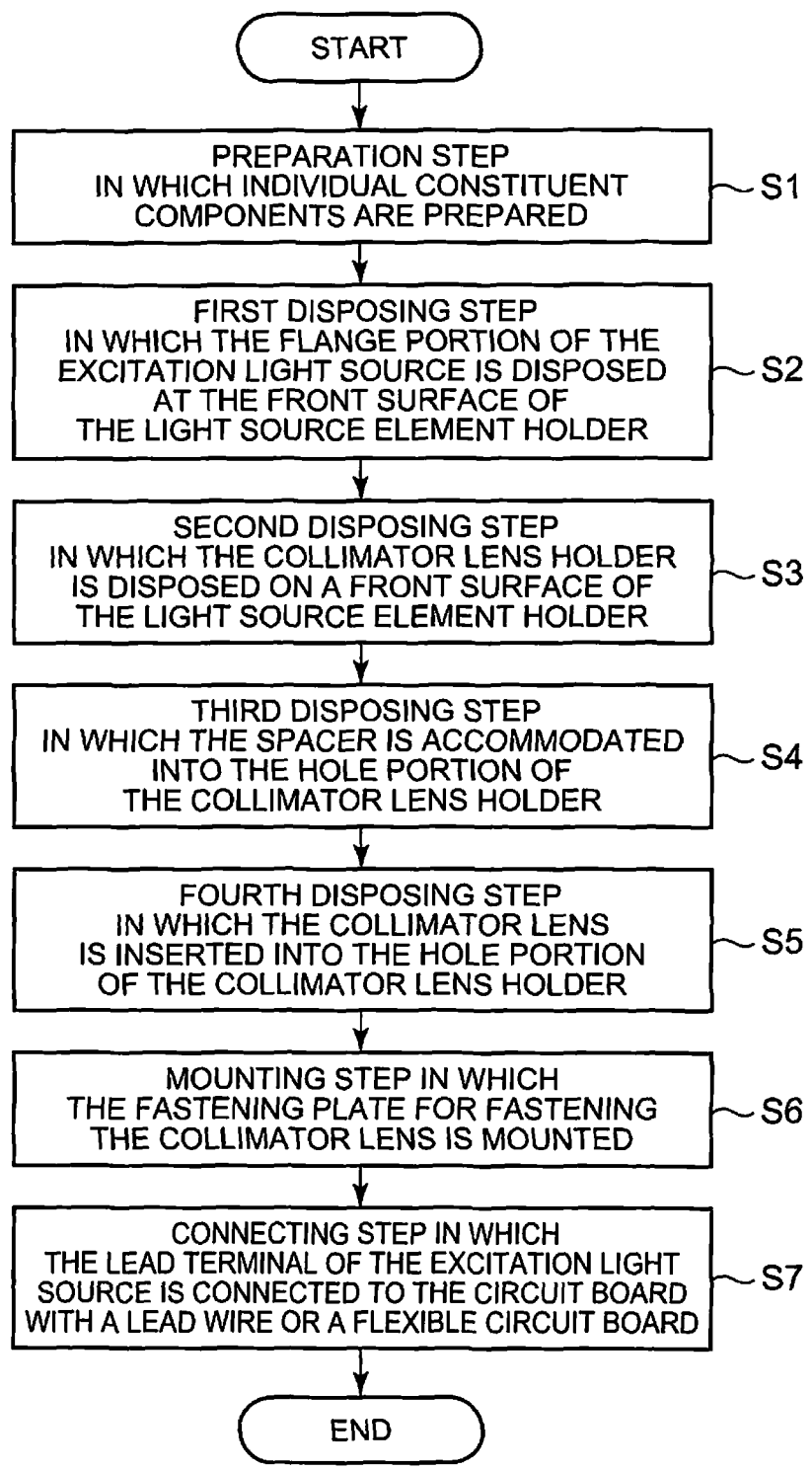
FIG. 11 is a flowchart explaining a fabrication method of the light source device according to the embodiment of the invention.

FIG. 10 is an explanatory diagram depicting the flow of a fabrication method of the light source device, and FIG. 11 is a flowchart depicting the fabrication method of the light source device.

As has been described above, the light source device is made up by mounting the excitation light source 71 which has the cylindrical flange portion 71*a* and the cylindrical portion 71*b* having the cylindrical shape which is smaller in diameter than the flange portion 71*a*, the light source element holder 82 which is disposed with the rear of the flange portion 71*a* of the excitation light source 71 in abutment therewith, the collimator lens 73 which turns light emitted from the excitation light source 71 into parallel light, the spacer 84 which is the annular member that has the substantially hollow cylindrical shape and which is disposed so as to be interposed between the excitation light source 71 and the collimator lens 73 with the rear end face 84*a* brought into abutment with the front surface of the flange portion 71*a* of the excitation light source 71 and the front end face 84*b* brought into abutment with the rear surface of the collimator lens 73, and the collimator lens holder 79 which is disposed so as to be brought into abutment with the light source element holder 82 with the collimator lens 73 and the spacer 84 accommodated in the hole portion 79*d* thereof.

In the fabrication method of the light source device, firstly, a preparation step is executed in which the aforesaid individual constituent components are prepared (step S1).

Then, as shown in a rightmost position in FIG. 10, firstly, a first disposing step is executed in which a lead terminal of the excitation light source 71 is inserted through the hole portion 82*a* of the light source element holder 82, and the flange portion 71*a* of the excitation light source 71 is disposed at the front surface of the light source element holder 82 (step S2).

Next, a second disposing step is executed in which the collimator lens holder 79 is disposed on the light source element holder 82 so as to be brought into abutment with the light source element holder 82 in which the excitation light source 71 is disposed by matching the excitation light source 71 with the hole portion 79*d* so that an outer circumference of the flange portion 71*a* of the excitation light source 71 is brought into contact with the hole portion 79*d* of the collimator lens holder 79 (step S3).

As this occurs, since the tapered portion 79*c* is formed at the circumferential edge of an opening portion where the collimator lens holder 79 is disposed, the collimator lens holder 79 can easily be disposed on the light source element holder 82.

Following step S3, a third disposing step is executed in which as shown by a middle arrow in FIG. 10, the spacer 84 is accommodated from the front of the collimator lens holder 79 which is disposed in abutment with the light source element holder 82 into the portion inside the hole portion of the collimator lens holder 79 which lies at the rear side of the hole portion 79*d* so that the rear end face 84*a* of the spacer 84 is brought into abutment with the front surface of the flange portion 71*a* of the excitation light source 71, so as to be disposed therein (step S4).

Next, a fourth disposing step is executed in which the collimator lens 73 is inserted into the hole portion 79*d* of the collimator lens holder 79 so as to be brought into abutment with the front end face 84*b* of the spacer 84, so as to be disposed therein (step S5).

Further, in order to fix the collimator lens 73, as indicated by a leftmost arrow in FIG. 10, a mounting step is executed in which the collimator lens 73 is fastened from the front thereof by the fastening plate 89, and the fastening plate 89 is mounted to the light source element holder 82 with screws or the like so as to be integrated therewith (step S6).

Then, a connecting step is executed in which the lead terminal of the excitation light source 71 is connected to the control circuit board 241 on which the light source control circuit 41 is mounted with a lead wire or a flexible circuit board, which is not shown (step S7).

In this way, since the fabrication method of the light source device includes the aforesaid steps, the collimator lens 73 and the excitation light source 71 can be disposed by the spacer 84 so that the optical axis of the excitation light source 71 and the optical axis of the collimator lens 73 are made parallel to each other or made to coincide with each other, and the excitation light source 71 and the collimator lens 73 can be disposed at the predetermined distance.

In the embodiment that has been described heretofore, the configuration of the excitation light shining device 70 which is the blue light source device is described as the light source device of the projector 10.

However, the light source device of this invention can also be applied, for example, to a red light source device 120 or a green light source device of the projector 10 which has an optical system configured so as to have a light source group in which a plurality of light sources are arranged in rows and columns into a plane configuration and a lens group which collects pencils of light which are emitted from the individual light sources in a similar fashion.

Namely, the light source device of the invention can be used in the projector 10 as at least any of the red light source device 120, the green light source device and the blue light source device.

Additionally, in the embodiment, the configuration of the excitation light shining device 70 which is formed by disposing the plurality of blue laser diodes which are the semiconductor light emitting elements into a matrix fashion is described as the light source device of the projector 10.

However, the light source of the invention can also be applied, for example, to a light source device which is configured so as to include a light source made up of a single light emitting element having a large light emitting capacity and a collective lens which collects pencils of light which are emitted from the light source in a similar fashion.

Thus, as has been described heretofore, according to the embodiment of the invention, it is possible to provide the light source device in which the collimator lens 73 and the excitation light source 71 are disposed by the spacer 84 which is the annular member having the hollow cylindrical shape so that the optical axis of the excitation light source 71 and the optical axis of the collimator lens 73 are made parallel to each other or made to coincide with each other and the excitation light source 71 and the collimator lens 73 can be disposed at the predetermined distance, the projector 10 which includes this light source device and the fabrication method of the light source device.

In addition, according to the embodiment of the invention, since the collimator lens holder 79 is configured so as to accommodate therein the cylindrical portion 71*b* of the excitation light source 71, the spacer 84 and the collimator lens 73, the mounting accuracy with which the constituent components are mounted in the associated fashion is not necessary, thereby making it possible to reduce the fabrication costs of the light source device.

Additionally, according to the embodiment of the invention, since the rear end face 84a and the front end face 84b of the spacer 84 are formed perpendicular relative to the optical axes of the excitation light source 71 and the collimator lens 73, the optical axes of the excitation light source 71 and the collimator lens 73 which are positioned by the spacer 84 can be made parallel to each other or made to coincide with each other.

In addition, according to the embodiment of the invention, since the rear end face 84a of the spacer 84 is formed perpendicular to the optical axes of the excitation light source 71 and the collimator lens 73 while the front end face 84b of the spacer 84 is formed into the similar curved surface to the rear curved surface of the collimator lens 73, the optical axis of the excitation light source 71 and the optical axis of the collimator lens 73 can be made parallel to each other or made to coincide with each other in an ensured fashion, and the excitation light source 71 and the collimator lens 73 can be disposed at the predetermined distance.

Additionally, according to the embodiment of the invention, since the annular portion is formed at the front end face 84b side of the spacer 84 so as to hold the rear surface and part of the rear lateral surface of the collimator lens 73, the disposing position of the collimator lens 73 can be controlled and the collimator lens 73 can be disposed in the predetermined position where the optical axis of the collimator lens 73 becomes coaxial with the optical axis of the excitation light source 71.

Further, according to the embodiment of the invention, the annular portion is formed at the rear end face 84a side of the spacer 84 so as to hold the front surface and part of the lateral surface of the flange portion 71a of the excitation light source 71, the disposing position of the excitation light source 71 can be controlled and the excitation light source 71 can be disposed in the predetermined position where the optical axis of the excitation light source 71 becomes coaxial with the optical axis of the collimator lens 73.

Then, according to the embodiment of the invention, by adopting the configuration in which the depressed element bearing portion 82b is provided on the light source element holder 82 and the heat conductive filling material such as the heat conductive grease 83 is filled in the gap that is formed at the lateral surface portion of the flange portion 71a, the heat generated in the excitation light source 71 can be dissipated in the effective fashion.

In addition, according to the embodiment of the invention, since the collimator lens 73 is fastened by the fastening plate 89 which is pressed against the collimator lens 73 from the front thereof to fix the collimator lens 73 in place, the movement of the optical axis of the collimator lens 73 can be prevented.

Further, according to the embodiment of the invention, even in the event that the plurality of excitation light sources 71 are disposed in the matrix fashion, since the optical axes of the individual excitation light sources 71 can be made parallel to each other, the position adjusting work of the excitation light sources 71 can be reduced.

While the examples of the layouts of the light source device according to the embodiment of the invention have been described heretofore, the examples are presented as examples of the invention, and hence, there is no intention to limit the scope of the invention by those examples.

These novel examples can be carried out in other various forms, and various omissions, replacements or modifications can be made thereto without departing from the spirit and scope of the invention.

The examples of the embodiment and modifications that are made thereto are to be incorporated in the spirit and scope of the invention and are also to be incorporated in the scope of inventions set forth in claims and equivalents thereof.

What is claimed is:

1. A light source device comprising:
   a light source element having a flange portion and a cylindrical portion having a cylindrical shape which is smaller in diameter than the flange portion;
   a light source element holder which is disposed with a rear of the flange portion of the light source element brought into abutment therewith;
   a collimator lens which transforms light emitted from the light source element into parallel light;
   a hollow cylindrical annular member that is disposed between the light source element and the collimator lens, and of which a rear end face is brought into abutment with a front surface of the flange portion of the light source element and a front end face is brought into abutment with a rear surface of the collimator lens; and
   a collimator lens holder which accommodates the collimator lens in a hole portion formed therein;
   wherein the light source element holder includes a depressed element bearing portion where the rear of the flange portion of the light source element is disposed while being in abutment therewith; and
   wherein a heat conductive filling material is filled in the depressed element bearing portion.

2. The light source device as set forth in claim 1, wherein the light source element and the annular member are accommodated in the hole portion in the collimator lens holder.

3. The light source device as set forth in claim 1, wherein the rear end face of the annular member is formed as a flat surface which is at a right angle to an axis of the annular member.

4. The light source device as set forth in claim 1, wherein the front end face of the annular member is formed as a flat surface which is at a right angle to the axis of the annular member.

5. The light source device as set forth in claim 1, wherein the front end face of the annular member is formed into a curved surface which matches a curved surface of the rear surface of the collimator lens.

6. The light source device as set forth in claim 1, wherein an annular portion is formed at a circumferential edge of an outer circumference of the front end face of the annular member.

7. The light source device as set forth in claim 1, wherein an annular portion is formed at a circumferential edge of an outer circumference of the rear end face of the annular member.

8. The light source device as set forth in claim 1, further comprising a lens fastening member which fastens the collimator lens.

9. The light source device as set forth in claim 1, wherein a plurality of light source elements as the light source element are provided in a matrix fashion.

10. A projector comprising:
    the light source device set forth in claim 1;
    a display element;
    a light source side optical system which guides light from the light source device to the display element;
    a projection side optical system which projects an image emitted from the display element onto a screen; and
    a projector control unit which controls the light source device and the display element.

11. A light source device fabrication method comprising:
a preparation step of preparing:
- a light source element having a flange portion and a cylindrical portion having a cylindrical shape which is smaller in diameter than the flange portion;
- a light source element holder which includes a depressed element bearing portion where a rear of the flange portion of the light source element is disposed while being in abutment therewith, wherein a heat conductive filling material is filled in the depressed element bearing portion;
- a collimator lens which transforms light emitted from the light source element into parallel light;
- a hollow cylindrical annular member that is disposed between the light source element and the collimator lens, and of which a rear end face is brought into abutment with a front surface of the flange portion of the light source element and a front end face is brought into abutment with a rear surface of the collimator lens; and
- a collimator lens holder which is disposed in abutment with the light source element holder;

a first disposing step of disposing the light source element in the light source element holder;
a second disposing step of disposing the collimator lens holder on the light source element holder by matching the light source element with a hole portion in the collimator lens holder so that an outer circumference of the flange portion of the light source element is brought into contact with the hole portion;
a third disposing step of disposing the annular member in the hole portion of the collimator lens holder so that a front surface of the flange portion of the light source element is brought into abutment with the rear end face; and
a fourth disposing step of disposing the collimator lens in the hole portion of the collimator lens holder so as to be brought into abutment with the front end face.

12. The light source device fabrication method as set forth in claim 11, comprising further comprising a mounting step of mounting a fastening plate which fastens the collimator lens.

13. The light source device fabrication method as set forth in claim 11, comprising further comprising a connecting step of connecting a lead wire or a circuit board to a lead terminal of the light source element.

14. A light source device comprising:
- a light source element having a flange portion;
- a light source element holder which is disposed with a rear of the flange portion of the light source element brought into abutment therewith;
- a depressed element bearing portion at which the rear of the flange portion of the light source element is disposed while being in abutment therewith; and
- a heat conductive filling material which is filled in the depressed element bearing portion.

15. A projector comprising:
- the light source device set forth in claim 14;
- a display element;
- a light source side optical system which guides light from the light source device to the display element;
- a projection side optical system which projects an image emitted from the display element onto a screen; and
- a projector control unit which controls the light source device and the display element.

* * * * *

UNITED STATES PATENT AND TRADEMARK OFFICE
CERTIFICATE OF CORRECTION

PATENT NO. : 9,158,188 B2  
APPLICATION NO. : 13/599328  
DATED : October 13, 2015  
INVENTOR(S) : Momoko Hayashi Page 1 of 1

It is certified that error appears in the above-identified patent and that said Letters Patent is hereby corrected as shown below:

In the claims,

Column 18, line 8, change "comprising further comprising" to --further comprising--.

Column 18, line 12, change "comprising further comprising" to --further comprising--.

Signed and Sealed this  
Second Day of August, 2016

Michelle K. Lee  
*Director of the United States Patent and Trademark Office*